United States Patent Office 3,281,472
Patented Oct. 25, 1966

3,281,472
PREPARATION OF PERFLUOROALIPHATIC SULFONES
Richard F. Heine, White Bear Lake, Minn., assignor to Minnesota Mining and Manufacturing Company, St. Paul, Minn., a corporation of Delaware
No Drawing. Filed Jan. 22, 1964, Ser. No. 339,343
3 Claims. (Cl. 260—607)

This invention is directed to new and useful methods for reacting perfluoroaliphaticsulfonyl fluorides with aliphatic organolithium compounds.

The products of reacting perfluoroaliphaticsulfonyl fluorides with aliphatic organolithium compounds in accordance with the teachings of this invention are primarily perfluoroaliphatic sulfones and di(perfluoroaliphatic sulfonyl)alkanes. These compounds were disclosed by Brown in a paper given at a meeting of the American Chemical Society in Minneapolis, Minnesota, in September 1955. These compounds are useful as intermediates, as hydraulic fluids, as plasticizers for fluorocarbon plastics, and as surfactants for hydrocarbon liquids.

The processes of the present invention involve contacting perfluoroaliphaticsulfonyl fluoride with an aliphatic organolithium compound. The organolithium compound is first preferably dissolved in an anhydrous liquid medium and thereafter the resulting medium is contacted with perfluoroaliphaticsulfonyl fluoride.

During the period of contacting, the temperature of the reaction mixture is maintained below 40° C., and preferably in the range of about —80° to 0° C.

Since perfluoroaliphaticsulfonyl fluorides and organolithium compounds are both well known, this specification is not burdened with a recitation of methods for their respective preparations.

The perfluoroaliphaticsulfonyl fluorides including perfluorocycloaliphatic sulfonyl fluorides can be represented by the following generic structural formula:

(1) R$_f$SO$_2$F wherein R$_f$ is a saturated fluorocarbon structure containing from 1 to 18 carbon atoms. R$_f$ can be perfluoroalkyl and perfluorocycloalkyl groups. Examples of perfluoroaliphaticsulfonyl fluorides include perfluoromethanesulfonyl fluoride, perfluoroethanesulfonyl fluoride, perfluorobutanesulfonyl fluoride, perfluorohexanesulfonyl, fluoride, perfluorooctanesulfonyl fluoride, perfluorododecanesulfonyl fluoride, perfluorooctadecanesulfonyl fluoride, perfluorocyclohexanesulfonyl fluoride, perfluoro-2-methylcyclohexanesulfonyl fluoride, perfluoro-4-ethylcyclohexanesulfonyl fluoride, perfluorocyclohexylmethanesulfonyl fluoride, perfluoro-4-dodecyclohexanesulfonyl fluoride, and the like.

Aliphatic lithium compounds used in this invention contain from 1 to 18 carbon atoms as illustrated by such compounds as: butyl lithium, methyl lithium, allyl lithium, s-butyl lithium, vinyl lithium, n-octyl lithium, 2-ethylhexyl lithium, decyl lithium, octadecyl lithium, and the like.

In general, organolithium reagents useful in this invention are characterized by the formula:

(2) RCH$_2$Li wherein R is an alkyl or alkylene radical which contains less than 19 carbon atoms.

In general, the anhydrous liquid medium used for this invention should have no hydroxyl material of any kind present. By the term hydroxyl material, reference is had to compounds including alcohols, acids, water, etc., which contain Zerewitinoff hydrogen.

Of course, such medium should also be one which is stable and safe to use under the conditions employed for the reaction. Preferably the medium is also a solvent for the perfluoroalkanesulfonyl fluoride. Preferred solvents for use in the processes of the present invention are ethers such as diethyl ether, di-isopropyl ether, tetrahydrofuran, dioxane, and the like; hydrocarbon solvents, though not completely dissolving the R$_f$SO$_2$F may be used as liquid reaction media for this invention.

The reaction between perfluoroaliphatic sulfonyl fluoride and an aliphatic lithium reagent may be summarized by the following equation:

(3) R$_f$SO$_2$F+RCH$_2$Li→R$_f$SO$_2$CH$_2$R+(R$_f$SO$_2$)$_2$CHR wherein R$_f$ is a perfluoroalkyl or a perfluorocycloalkyl radical containing from 1 to 18 carbon atoms and R is an aliphatic radical containing less than 19 carbon atoms.

The invention is further illustrated by the following example:

*Example 1*

Reaction of butyl lithium with perfluorooctanesulfonyl fluoride. Butyl lithium (0.1 mole) is prepared from butyl chloride and lithium wire in ether. Perfluorooctanesulfonyl fluoride (0.1 mole) is added to this at 0° C. with stirring. The color of the mixture progresses from essentially colorless through yellow, orange and finally deep red during the addition. The resulting mixture is stirred an additional hour and then poured into 500 ml. of aqueous hydrochloric acid at 10° C. The ether layer is separated, the aqueous layer extracted with ether and the ether layers combined. After drying over anhydrous magnesium sulfate, the ethereal solution is evaporated to dryness. Recrystallization from 95% ethyl alcohol gives 4.5 g. of a more soluble fraction melting at 68–69° C. and 13.5 g. of a less soluble fraction melting at 79–81° C.

Analysis of the product which melts at 68–69° C.: 26.39% C; 60.0% F. Since C$_8$F$_{17}$SO$_2$C$_4$H$_9$ requires: 26.7% C; 59.9% F, presumably this product results. Analysis of the product which melts at 79–81° C.: 23.6% C; 62.7% F. Since (C$_8$F$_{17}$SO$_2$)$_2$CHC$_3$H$_7$ requires 23.4% C: 23.6% C; 62.7% F, presumably this product results also.

A trace amount of high boiling liquid residue is found and purified to 88% purity by a preparative gas liquid chromatography column containing the methyl ester of 3,5,7,8 - tetrachloroundecafluorooctanoic acid. Infra-red absorptions at 5.9 microns for C=C, 8–9 microns for C—F and 3.3–3.4 microns for CH plus n.m.r. analysis:

$$129.2\phi \text{ for} -\frac{F}{C}=$$

112.9$\phi$ for —CF$_2$—C=  indicate a C$_6$F$_{13}$CF=C(C$_4$H$_9$)$_2$ structure.

In addition to these products, when the acidic water layers from the workup are evaporated to dryness, a water soluble tan solid is obtained. Infra-red analysis indicates the major component is perfluorooctanesulfinic acid, hydrated.

What is claimed is as follows:
1. The process of reacting a perfluoroalkanesulfonyl fluoride with an aliphatic organolithium compound comprising contacting such perfluoroalkanesulfonyl fluoride with such aliphatic organolithium compound characterized by the formula

RCH$_2$Li wherein R is selected from the group consisting of alkyl and alkylene radicals which contain less than 19 carbon atoms each in a stable anhydrous liquid while maintaining a temperature below about 40° C.

2. A process for preparing perfluoroalkanesulfonyl alkanes comprising the steps of first contacting a perfluoroaliphaticsulfonyl fluoride of the formula:

$$R_fSO_2F$$

wherein $R_f$ is a saturated fluorocarbon structure containing less than 19 carbon atoms, with an anhydrous solution of an aliphatic organolithium compound of the formula:

$$RCH_2Li$$

wherein R is selected from the group consisting of an alkyl and alkylene radical containing less than 19 carbon atoms each while maintaining the reaction mixture at a temperature below 40° C., and thereafter recovering perfluoroalkanesulfonyl alkanes from the reaction mixture.

3. A process for preparing perfluoroalkanesulfonyl alkanes comprising the steps of first contacting perfluorooctanesulfonyl fluoride with an anhydrous solution of butyl lithium while maintaining the reaction mixture at a temperature below 40° C., and thereafter recovering perfluoroalkanesulfonyl alkanes from the reaction mixture.

No references cited.

CHARLES B. PARKER, *Primary Examiner.*

DELBERT R. PHILLIPS, *Assistant Examiner.*